US007601413B2

(12) United States Patent
Daniel et al.

(10) Patent No.: US 7,601,413 B2
(45) Date of Patent: *Oct. 13, 2009

(54) RANDOM INSTALLATION CARPET TILES

(75) Inventors: Sydney D. Daniel, LaGrange, GA (US); David D. Oakey, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 253 days.

This patent is subject to a terminal disclaimer.

(21) Appl. No.: 11/433,977

(22) Filed: May 15, 2006

(65) Prior Publication Data

US 2006/0240210 A1 Oct. 26, 2006

Related U.S. Application Data

(63) Continuation of application No. 10/417,630, filed on Apr. 16, 2003, now abandoned, which is a continuation of application No. 09/783,354, filed on Feb. 14, 2001, now Pat. No. 6,908,656.

(51) Int. Cl.
*B32B 3/14* (2006.01)
*B32B 33/00* (2006.01)

(52) U.S. Cl. ............................ 428/88; 428/89; 428/44; 428/48

(58) Field of Classification Search .................. 428/88, 428/89, 44, 48, 49, 50, 51, 53; D06/582–594; D05/62; D25/157, 158–162, 136, 163
See application file for complete search history.

(56) References Cited

U.S. PATENT DOCUMENTS 3,850,783 A 11/1974 Peters et al.

(Continued)

FOREIGN PATENT DOCUMENTS

BE 890 436 1/1982

(Continued)

OTHER PUBLICATIONS

Order dated May 29, 2007 in *Collins & Aikman Floor Coverings, Inc. et al.* vs. *Interface, Inc.*, CAN 4:05-CV-0133-HLM, et al., United States District Court, Northern District of Georgia, Rome Division.

(Continued)

*Primary Examiner*—Cheryl Juska
(74) *Attorney, Agent, or Firm*—Kilpatrick Stockton LLP; John S. Pratt; Kristin J. Doyle

(57) ABSTRACT

Carpet tiles having patterns and color schemes that obviate the need to orient the tiles relative to each other. The tiles exhibit orthogonal ambiguity, meaning that they may be laid in any side-by-side orientation with respect to adjacent tiles without looking out of place to the ordinary viewer and thereby still achieving an appearance of continuity like broadloom carpet. Each tile has patterns of shapes having some straight sides and that appear to be randomly positioned but oriented with some straight sides parallel to carpet tile sides. The shapes are formed from a color or combination of colors so that adjacent shapes on each tile have at least one color in common. Furthermore, each tile has at least one color in common with every other tile, so that when the tiles are laid, the colors on adjacent tiles coordinate. All of the colors have similar intensities so that no one color will significantly stand out from the other colors. Moreover, because the pattern on each tile appears random, placement of the tiles on the floor in any side-by-side orientation simply creates a larger, apparently random pattern, rendering it impossible for any tile to look out of place.

15 Claims, 5 Drawing Sheets
(5 of 5 Drawing Sheet(s) Filed in Color)

U.S. PATENT DOCUMENTS

| | | | |
|---|---|---|---|
| 3,875,716 | A | 4/1975 | Eusemann |
| 4,243,709 | A | 1/1981 | Morton |
| 4,574,065 | A | 3/1986 | Appleyard et al. |
| 4,656,065 | A | 4/1987 | Yacovella |
| 4,737,764 | A | 4/1988 | Harrison |
| 4,740,213 | A | 4/1988 | Ricci |
| 4,868,019 | A | 9/1989 | Knickerbocker |
| 4,872,647 | A | 10/1989 | Paradise |
| 4,931,320 | A | 6/1990 | Leonard |
| 5,011,411 | A | 4/1991 | Loewy |
| 5,179,749 | A | 1/1993 | Magee |
| 5,198,277 | A | 3/1993 | Hamilton |
| 5,274,848 | A | 1/1994 | Shamblin |
| 5,445,863 | A | 8/1995 | Slagle et al. |
| 5,484,639 | A | 1/1996 | Woodall et al. |
| 5,486,385 | A | 1/1996 | Bylund et al. |
| 5,920,903 | A | 7/1999 | Koehntop |
| 6,194,329 | B1 | 2/2001 | Nelson et al. |
| 6,203,879 | B1 | 3/2001 | Desai |
| 6,526,704 | B1 | 3/2003 | Berard et al. |
| 6,555,203 | B1 | 4/2003 | Karlsson |
| 2002/0136855 | A1 | 9/2002 | Daniel et al. |
| 2004/0185219 | A1 | 9/2004 | Guess |

FOREIGN PATENT DOCUMENTS

| | | |
|---|---|---|
| EP | 0 698 863 | 2/1996 |
| GB | 1 537 727 | 1/1979 |
| JP | 4915217 | 2/1974 |
| JP | 5819687 | 2/1983 |
| JP | 58218921 | 12/1983 |
| JP | 4-125773 | 11/1992 |
| JP | 5-163825 | 6/1993 |
| JP | 11312246 | 11/1999 |
| JP | 2003-96654 | 4/2003 |
| WO | WO-9814656 A1 | 4/1998 |
| WO | WO 0194689 A2 | 12/2001 |

OTHER PUBLICATIONS

Supplemental Information disclosure Statement Dated Nov. 18, 2005 and Exhibits thereto as follows.

Exhibit A: Collins & Aikman Floorcoverings, Inc. Mohawk Industries, Inc., Mohawk Brands Inc. and Shaw Industries Group, Inc. *Plaintiffs* v. *Interface, Inc. Defendant,* USDC, Northern District of Georgia, Rome Division, Civil Action No. 4:05-CV-00133-HLM, Amended Complaint dated Sep. 26, 2005.

Exhibit B: Declaration of David D.Oakey, dated Nov. 16, 2005.

Exhibit C: Office Action issued Dec. 17, 2003 in U.S. Appl. No. 09/783,354.

Exhibit D: Office Action Issued Jun. 21, 2004 in U.S. Appl. No. 09/783,354.

Exhibit E: Amendment and response filed with the U.S. patent Office on Jul. 12, 2004 in U.S. Appl. No. 09/783,354.

Exhibit F: Notice of Allowability issued Oct. 4, 2004 in U.S. Appl. No. 09/783, 354.

Notice of filing of Submission of Publication Etc. Issued by the Japanese Patent Office on Jan. 18, 2005 in JP 2002-584181 (Published as JP 2004-524-452).

Submission of Publications Etc. filed with the Japanese Patent Office on Nov. 1, 2004 in JP 2002-564181 (Published as JP 2004-524452).

Notice of the Reasons for Refusal issued by Japanese Patent Office on Dec. 15, 2003 in JP 2001-288184 (Published as JP 2003-96654).

Decision of Refusal issued by Japanese Patent Office on Mar. 5, 2004 in JP 2001-288184 (published as JP 2003-96654).

Color specification page for product NT 2100 in Carpet Tile catalog from Sangesu, dated 1997-1999.

Patent Abstracts of Japan, JP 2003-96654 (Nippon Jutan KK) Apr. 3, 2003.

espc@cenet Worldwide database, JP 5-163825 (Nippon Jutan KK) Jun. 29, 1993.

Photo of Mohawk Commercial—Brain Box; “Can you tell where the tile ends and the broadloom begins?”; Publisher unknown—undated.

Collins & Aikman Floor Coverings, Inc.—10K—For Jan. 31, 2004; www.secinfo.com/d14D5a.12P5w.htm; Apr. 27, 2006.

Tessera Carpet Tiles—Mix—Random lay, batchless carpet tiles; www.tesseracarpettiles.com/product/mix.htm; Apr. 27, 2006.

Tessera Carpet Tiles—Artworks Deco—Textured loop pile carpet tile; www.tesseracarpettiles.com/product/artworks.htm; Apr. 27, 2006.

Mannington Commercial—Ruth’s Chris Steak House renovation details (Design objective, flooring solution, product benefits); E-Ticket 18"x18" Infinity Cushion Carpet Tile; Publisher unknown—undated.

Paragon by Heckmondwike: Paragon tufted carpets and carpet tiles; www.pbyh.co.uk—undated.

Practical Facilities Management; Gaskell Carpet Tiles on radio station’s wavelength; publisher unknown; Apr. 27, 2006.

Quadrant—Providing a quality service to specifiers of commercial carpets; Versatek Strata—Product Specification; Publisher unknown—undated.

Expert Report of Robert V. Yates, Jr. issued Sep. 12, 2007 in *Collins & Aikman Floor Coverings, Inc. et al.* vs. *Interface, Inc.,* CAN 4:05-CV-0133-HLM, et al., United States District Court, Northern District of Georgia, Rome Division.

Expert Report of Richard A. Killworth, Esq. issued Sep. 12, 2007 in *Collins & Aikman Floor Coverings, Inc. et al.* vs. *Interface, Inc.,* CAN 4:05-CV-0133-HLM, et al., United States District Court, Northern District of Georgia, Rome Division.

Expert Report of Andrew Broadhead issued Sep. 12, 2007 in *Collins & Aikman Floor Coverings, Inc. et al.* vs. *Interface, Inc.,* CAN 4:05-CV-0133-HLM, et al., United States District Court, Northern District of Georgia, Rome Division.

Plantiff’s Motion for Partial Summary Judgement That the Claims of U.S. Patent No. 6,908,656 are Invalid Pursuant to 35 U.S.C. 112, Paragraph 1 (Written Description) and Paragraph 2 (Indefiniteness), Civil Action No. (“CAN”) 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Dec. 21, 2005.

Memorandum of Points and Authorities in Support of Plantiffs’ Motion for Partial Summary Judgment . . . , Civil Action No. (“CAN”) 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Dec. 21, 2005.

Plantiffs’ Statement of Material Facts in Support of Plantiffs’ Motion for Partial Summary Judgment . . . , Civil Action No. (“CAN”) 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Dec. 21, 2005.

Declaration of Timothy Majors in Support of Plantiffs’ Motion for Partial Summary Judgment . . . , Civil Action No. (“CAN”) 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Dec. 21, 2005.

Interface’s Brief in Opposition to Motion for Partial Summary Judgment, Civil Action No. (“CAN”) 4:05-CV-00189HLM; CAN 4:05-CV-00190-HLM; CAN 4:05-CV-00191-HLM & CAN 4:05-CV-00133-HLM, U.S. District Court for Northern District of Georgia, Rome Division, Jan. 27, 2006.

Interface’s Response to Accused Infringers’ Statement of Material Facts in Support of Motion for Partial Summary Judgment and Statement of Material Facts as to Which There is a Genuine Issue to be Tried, Civil Action No. (“CAN”) 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jan. 27, 2006.

Declaration of Clara Ellenburg-Aplin, Civil Action No. (“CAN”) 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jan. 27, 2006.

Declaration of William N. Jones, Civil Action No. ("CAN") 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jan. 27, 2006.
Declaration of William Noles, Civil Action No. ("CAN") 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jan. 26, 2006.
Declaration of Eugene B. Joswick in Support of Interface's Brief in Opposition to Motion for Partial Summary Judgment, Civil Action No. ("CAN") 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jan. 27, 2006.
Reply in Support of Plantiffs' Motion for Partial Summary Judgment . . . , Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Feb. 13, 2006.
Order Denying Plantiffs' Motion for Partial Summary Judgment, CAN 4:05-CV-00133-HLM, U.S. District Court for Northern District of Georgia, Rome Division, Feb. 28, 2006.
Declaratory Judgment Plantiffs' Joint Preliminary Invalidity Contentions, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Mar. 6, 2006.
Interface, Inc.'s Objections and Responses to Collins & Aikman Floorcoverings, Inc., Mohawk Industries, Inc. and Shaw Industries Group, Inc.'s First Set of Interrogatories, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Feb. 3, 2006.
Interface, Inc.'s Objections and Responses to Second Set of Interrogatories (Nos. 24-26), Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Feb. 27, 2006.
Interface, Inc.'s Second Supplemental and Supplemental Responses to Collins & Aikman Floorcoverings, Inc. Mohawk Industries, Inc. And Shaw Industries Group, Inc.'s Interrogatories Nos. 8-11, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, May 22, 2006.
Interface, Inc.'s Responses to First Set of Requests for Admission, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, May 24, 2006.
Interface's Objections and Responses to Accused Infringers' Third Set of Interrogatories, Civil Action No. ("CAN") 4:05-CV-00189-HLM; CAN 4:05-CV-00190-HLM; CAN 4:05-CV-00191-HLM & CAN 4:05-CV-00133-HLM, U.S. District Court for Northern District of Georgia, Rome Division, Jul. 11, 2006.
Interface's Supplemental Responses to Collins & Aikman Floorcoverings, Inc., Mohawk Industries, Inc. and Shaw Industries Group, Inc.'s Interrogatory No. 11, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Jul. 11, 2006.
Carpet Sample Book, RETRO, Interface, 1998.
Carpet Sample Book, Light Show, Interface, May 1996.
Milliken Modular Carpets, Everwher® Installation Instructions, 1989.
"Performance or Aesthetics?," *Contract Flooring Review*, vol. 28, pp. 12, 13, Sep. 28, 1990.
Marilyn Zelinsky, "Jhane Barnes designs a line of carpet tile for Collins & Aikman, along with computer software to create nearly infinite pattern variations," *Interiors*, pp. 38, 37, 40, 65, Apr. 1997.
"2+2=Design," *Interiors & Sources*, pp. 42-48, May 1997.
Armstrong Floor Division Catalog, pp. 99-101, 1996.
U.S. Copyright Registration No. VA 935-259, "Tex: No. 185H," registered Feb. 22, 1999.
U.S. Copyright Registration No. VA 943-343, "Athena: No. TEX586," registered Aug. 27, 1998.
"Order" *inter alia:* denying Renewed Motion for Summary Judgment that the Claims [of the '656 patent] are Invalid Pursuant to 35 USC 112 (Enablement/Written Description), p. 112; denying "Renewed Motion for Summary Judgment that the Claims of [the'656 patent] are Invalid Pursuant to 35 USC 112 (Indefiniteness)," p. 123, and denying Renewed Motion in Limine to Exclude Certain Testimony of Interface's Proposed Expert William N. Jones, p. 125, *Collins & Aikman Floorcoverings, Inc. et al.* v. *Interface, Inc., et al., U.S.D.C. Northern District of Georgia, Rome Division, CAN 4:05-CV-00133-HLM* Feb. 25, 2009.
"Motion for Partial Summary Judgment that the Claims of U.S. Patent No. 6,908,656 are Invalid Pursuant to 35 USC §112, ¶1 (Enablement/Written Description)," *Collins & Aikman Floorcoverings, Inc. et al.* v. *Interface, Inc., et al., U.S.D.C. Northern District of Georgia, Rome Division, CAN 4:05-CV-00133-HLM,* Jan. 16, 2008.
"Memorandum of Points and Authorities in Support of . . . Motion for Partial Summary Judgment . . . (Enablement/Written Description)" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Jan. 16, 2008.
"Response to Motion for Partial Summary Judgment . . . (Enablement/Written Description)" (Filed Under Seal), *Collins & Aikman Floorcoverinqs, Inc. et al.* v. *Interface, Inc., et al., U.S.D.C. Northern District of Georgia, Rome Division, CAN 4:05-CV-00133-HLM,* Feb. 26, 2008.
"Reply Memorandum in Support . . . Motion for Partial Summary Judgment . . . (Enablement/Written Description)" (Filed Under Seal), *Collins & Aikman Floorcoverings, Inc et al.* v. *Interface, Inc., et al., U.S.D.C. Northern District of Georgia, Rome Division, CAN 4:05-CV-00133-HLM,* Mar. 28, 2008.
"Corrected Memorandum of Points and Authorities in Support of . . . Motion for Partial Summary Judgment . . . (Enablement/Written Description)" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Mar. 28, 2008.
Report & Recommendation of Special Master on motion for "partial summary judgment that claims of U.S. Patent No. 6,908,656 . . . are invalid for failure to adhere to the requirements of 35 USC 112, paragraph 1 (enablement)," *Collins & Aikman Floorcoverings, Inc. et al.* v. *Interface, Inc., et al., U.S.D.C. Northern District of Georgia, Rome Division, CAN 4:05-CV-0133-HLM,* Jan. 8, 2009.
"CAF, Shaw and Mohawk's Objections and Other Responses to the Special Master's Report and Recommendations as to Enablement and Written Description" (Filed Under Seal), *Collins & Aikman Floorcoverings, Inc. et al.*v. *Interface, Inc., et al., U.S.D.C. Northern District of Georgia, Rome Division, CAN 4:05-CV-0133-HLM,* Jan. 28, 2009.
"Interface's Motion to Adopt the Special Master's Report and Recommendation regarding CAF, Mohawk and Shaw's Motion for Partial Summary Judgment that the Claims of U.S. Patent No. 6,908,656 are Invalid Pursuant to 35 USC §112, ¶1 (Enablement/Written Description)," *Collins & Aikman Floorcoverings, Inc. et al.* v. *Interface, Inc., et al., U.S.D.C. Northern District of Georgia, Rome Division, CAN 4:05-CV-00133-HLM,* Jan. 28, 2009.
"CAF, Mohawk, and Shaw's Motion for Partial Summary Judgment that the Claims of U.S. Patent No. 6,908,656 are Invalid Pursuant to 35 USC §112, ¶2 (Indefiniteness)," *Collins & Aikman Floorcoverings, Inc. et al.* v. *Interface, Inc., et al., U.S.D.C. Northern District of Georgia, Rome Division, CAN 4:05-CV-00133-HLM,* Jan. 16, 2008.
"Memorandum of Points and Authorities in Support of . . . Motion for Partial Summary Judgment. . . . (Indefiniteness)" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Jan. 16, 2008.
"Response to Motion for Partial Summary Judgment . . . (Indefiniteness)" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM* Feb. 26, 2008.

"Reply Memorandum in Support of . . . Motion for Partial Summary Judgment . . . (Indefiniteness)" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Mar. 28, 2008.

Report and Recommendation of Special Master on motion for "partial summary judgment for failure to adhere to the requirements of 35 USC § 112, ¶2 (indefiniteness)," *Collins & Aikman Floorcoverings, Inc. et al.* v. *Interface, Inc., et al., U.S.D.C. Northern District of Georgia, Rome Division, CAN 4:05-CV-00133-HLM* Jan. 8, 2009.

"CAF, Shaw and Mohawk's Objections and Other Responses to the Special Master's Report and Recommendation as to Indefiniteness" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM* Jan. 28, 2009.

"Interface's Motion to Adopt the Special Master's Report and Recommendation Regarding Motion for Partial Summary Judgment regarding Indefiniteness," *Collins & Aikman Floorcoverings, Inc. et al.* v. *Interface, Inc., et al., U.S.D.C. Northern District of Georgia, Rome Division, CAN 4:05-CV-00133-HLM* Jan. 28, 2009.

"Motion to Exclude Testimony of Interface's Proposed Expert Witness William N. Jones," *Collins & Aikman Floorcoverings, Inc. et al.* v. *Interface, Inc., et al., U.S.D.C. Northern District of Georgia, Rome Division, CAN 4:05-CV-00133-HLM* Jan. 16, 2008.

"Memorandum of Law in Support of Motion to Exclude Testimony of Interface's Proposed Expert Witness William N. Jones" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM* Jan. 16, 2008.

"Response to . . . Motion to Exclude Testimony of William N. Jones" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM* Feb. 26, 2008.

"Reply In Support of CAF, Mohawk and Shaw's Motion to Exclude Certain Testimony of . . . William N. Jones" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Mar. 28, 2008.

Report and Recommendation of Special Master on motion for "an order declaring that William N. Jonnes is not competent to testify as an expert witness on enablement issues," *Collins & Aikman Floorcoverings, Inc. et al.* v. *Interface, Inc., et al., U.S.D.C. Northern District of Georgia, Rome Division, CAN 4:05-CV-00133-HLM,* Jan. 8, 2009.

"CAF, Shaw, and Mohawk's Objections and Other Responses to the Special Master's Report and Recommendation as to the Motion to Exclude Testimony of Interface, Inc.'s Proposed Expert Witness William N. Jones" (Filed Under Seal), *Collins & Aikman Floorcoverings, Inc. et al.* v. *Interface, Inc., et al., U.S.D.C. Northern District of Georgia, Rome Division, CAN 4:05-CV-00133-HLM,* Jan. 28, 2009.

"Interface's Motion to Adopt the Special Master's Report and Recommendation Regarding CAF, Mohawk & Shaw's Motion to Exclude Testimony of Interface, Inc.'s Proposed Expert Witness William N. Jones," *Collins & Aikman Floorcoverings, Inc. et al.* v. *Interface, Inc., et al., U.S.D.C. Northern District of Georgia, Rome Division, CAN 4:05-CV-00133-HLM* Jan. 28, 2009.

Notice of Reasons for Rejection issued in related Japanese Patent Application No. JP 2002-564181 on Oct. 21, 2008.

Second Amended Complaint for Declaratory Judgment of Patent Noninfringement, Invalidity and Unenforceability, and for Patent Infringement, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Nov. 10, 2006.

Motion for Partial Summary Judgment of No Inequitable Conduct, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Jan. 16, 2008.

Memorandum of Law in Support of Interface's Motion for Partial Summary Judgment of Non Inequitable Conduct, Civil Action No. ("CAN") 4:05-CV-00133-HLM; CAN 4:05-CV-00189-HLM; CAN 4:05-CV-00190-HLM & CAN 4:05-CV-00191- HLM, U.S. District Court for Northern District of Georgia, Rome Division, Jan. 16, 2008.

Statement of Undisputed Material Facts in Connection with Interface's Motion for Partial Summary Judgment of No Inequitable Conduct, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Jan. 16, 2008.

Declaration of Matthew M. Lubozynski in Support of Motion for Partial Summary Judgment of No Inequitable Conduct, Civil Action No. ("CAN") 4:05-CV-00133-HLM; CAN 4:05-CV-00189-HLM; CAN 4:05-CV-00190-HLM & CAN 4:05-CV-00191-HlM, U.S. District Court for Northern District of Georgia, Rome Division, Jan. 16, 2008.

Surrebuttal Report of Andrew Broadhead, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 29, 2007.

Expert Report of James A. Forstner, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 14, 2007.

Rebuttal Expert Report of Richard A. Killworth, Esq., Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 26, 2007.

Rebuttal Expert Report of Robert V. Yates, Jr., Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 15, 2007 (pp. 1-6 and Exhibit A).

Rebuttal Expert Report of Robert V. Yates, Jr. prepared for Shaw Industries Group, Inc. et al., Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 15, 2007 (pp. 1-7, Exhibits A & B).

Rebuttal Expert Report of Roberts V. Yates, Jr., Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 15, 2007 (pp. 1-10, Exhibits A & B).

Declaratory Judgment Plaintiff's Joint Preliminary Invalidity Contentions, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Mar. 6, 2006.

Declaratory Judgment Plaintiff's First Supplemental Joint Preliminary Invalidity Contentions, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Jun. 22, 2007.

Declaratory Judgment Plaintiff's Second Supplemental Joint Preliminary Invalidity Contentions, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Jun. 28, 2007.

Declaratory Judgment Plaintiff's Third Supplemental Joint Preliminary Invalidity Contentions, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Aug. 13, 2007.

Disclosure of Expert Assessments of William Nathan Jones on Issues Concerning Infringement of U.S. Patent No. 6,908,656, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Sep. 13, 2007.

Disclosure of Expert Assessments of William Nathan Jones on Issues Concerning Validity of U.S. Patent No. 6,908,656, Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 15, 2007.

Rebuttal Report of William Nathan Jones on Issues Raised in the Rebuttal Reports of Robert V. Yates, Jr., Civil Action No. ("CAN") 4:05-CV-00133-HLM; CAN 4:05-CV-00189-HLM; CAN 4:05-CV-00190-HLM & CAN 4:05-CV-00191-HLM, U.S. District Court for Northern District of Georgia, Rome Division, Oct. 29, 2007.

RANDOM INSTALLATION CARPET TILES

CROSS-REFERENCE TO RELATED APPLICATION

This application is a continuation application of U.S. patent application Ser. No. 10/417,630, filed Apr. 16, 2003, now abandoned, which is a continuation of U.S. patent application Ser. No. 09/783,354, filed Feb. 14, 2001, now U.S. Pat. No. 6,908,656, both of which are incorporated herein by reference in their entirety.

FIELD OF THE INVENTION

This invention relates generally to carpet tiles and a method of designing carpet tiles having patterns and color schemes that allow for placement of the carpet tiles in any orientation with respect to adjacent carpet tiles while still achieving the appearance of broadloom carpet.

BACKGROUND OF THE INVENTION

Traditionally, proper placement of carpet tiles has been necessary to give the appearance of seamless broadloom carpet or at least the appearance of a carpet tile installation in which tiles are not out of place or misplaced. Conventional carpet tiles, particularly including tufted, fusion bonded, or woven face carpet tiles, normally have a "direction" as a result of (1) the pattern on the tiles and/or (2) the manufacturing process.

After the carpet web is cut into the tiles, the tiles must be oriented on the floor so that their pattern aligns with the patterns on adjacent tiles or with the appearance of adjacent tiles. Most carpet tiles are square. If a first carpet tile is placed on the floor, a second tile may be placed in four different positions relative to each side of the first tile by placing the second tile adjacent to each of the four sides of the first tile and in four different orientations by rotating the second tile in 90 degree increments relative to the first carpet tile. In only one of the second tile's four rotational positions is the second tile oriented in the same "direction" as the first tile, so that both tiles are in the same rotational orientation as they were relative to each other in the carpet web from which they were cut or as they came off of the carpet producing machine. Moreover, some patterns used on carpet tiles require that the second tile be placed only adjacent to a particular side or sides of the first tile, rather than adjacent to any of the four sides of the first tile.

Furthermore, because of the manufacturing process, even solid color tiles without any pattern usually have a nap orientation or "direction." Additionally, minor variations in color require that carpet tiles in a particular installation all use yarn dyed in the same dye lot to avoid visually discernable differences between adjacent carpet tiles resulting from variations in dying.

Therefore, not only must the patterns of adjacent tiles be aligned, adjacent tiles must be placed so that the nap is oriented in the same direction, and it is frequently necessary to insure that adjacent tiles, and sometimes all tiles in a particular installation, were dyed or have fiber dyed at the same time. If one carpet tile in an installation is oriented improperly with respect to adjacent carpet tiles, it is usually readily apparent that the tile has been misplaced, thereby destroying the appearance of continuity of pattern, nap, and color of the entire carpet tile installation. The carpet installer, therefore, must spend valuable time during installation ensuring proper orientation of the tiles.

SUMMARY OF THE INVENTION

This invention addresses the above-described problems by providing carpet tiles and a method of making carpet tiles having patterns and color schemes that obviate the need to orient the tiles (with respect to pattern or nap) relative to each other and that generally eliminate the need to match tiles as to dye lot. Instead, the tiles exhibit orthogonal ambiguity, meaning that tiles may be laid in any side-by-side orientation with respect to adjacent tiles without looking out of place to the ordinary viewer and thereby still achieving an appearance of continuity across the entire installation as if the tiles were part of a broadloom web.

"Orthogonally ambiguous" tiles must be positioned in one of sixteen positions relative to each other tile. Such positioning is achieved by rotating adjacent tiles in ninety degree increments relative to each other. A "rotational position indeterminate" carpet web pattern can be imaged in which any tile can be cut from the web in any rotational position relative to any other tile cut from the web, including a rotational position displaced by other than ninety degree increments (e.g. forty-five degrees). However, cutting tiles from a web at such orientations would generally produce substantial waste and be impractical.

The orthogonally ambiguous tiles of this invention are produced by first producing a carpet web having a pattern exhibiting the characteristics described herein and then cutting the web into tiles in the conventional ways that tiles are typically cut from a carpet web produced for that purpose. The web has a pattern of shapes having at least some straight edges that will parallel the tile edges but that appear to be randomly oriented and positioned within the pattern. The shapes are formed from a color or combination of colors so that adjacent shapes on each tile have at least one color in common. Furthermore, each tile always has at least one color in common with every other tile, so that when the tiles are laid, the colors on adjacent tiles coordinate. All of the colors typically should have similar intensities so that no one color significantly stands out from the other colors.

Because the pattern on each tile appears random, placement of the tiles on the floor in any orientation simply creates a larger, apparently random pattern, rendering it impossible for any tile to look out of place. Such randomness masks the visual effects of having adjacent carpet tiles with misaligned or differently-oriented naps and also masks slight color variations resulting from dye lot differences. The presence, within the pattern, of shapes with edges parallel to the edges of the tile insures that, if the shapes are partitioned when the web is cut into tiles, the partitioned shapes will not appear out of place, since the shapes of the pattern already include elements, having straight edges parallel to at least one of the tile edges, similar to the partitioned shapes, which have a straight edge defined by the straight edge of a panel. Given the apparent randomness of the pattern and color scheme, worn or soiled tiles in a particular installation may easily be replaced with an unused tile without the new tile looking as dramatically different from the remaining tiles as often results with tiles with conventional patterns.

It is thus an object of this invention to provide carpet tiles that may be laid in any orientation with respect to each other and still achieve the appearance of a continuous piece of broadloom carpet.

BRIEF DESCRIPTION OF THE DRAWINGS

The file of this patent contains at least one drawing executed in color. Copies of this patent with color drawing(s)

will be provided by the Patent and Trademark Office upon request and payment of the necessary fee.

DETAILED DESCRIPTION OF THE DRAWINGS

Figure 1:
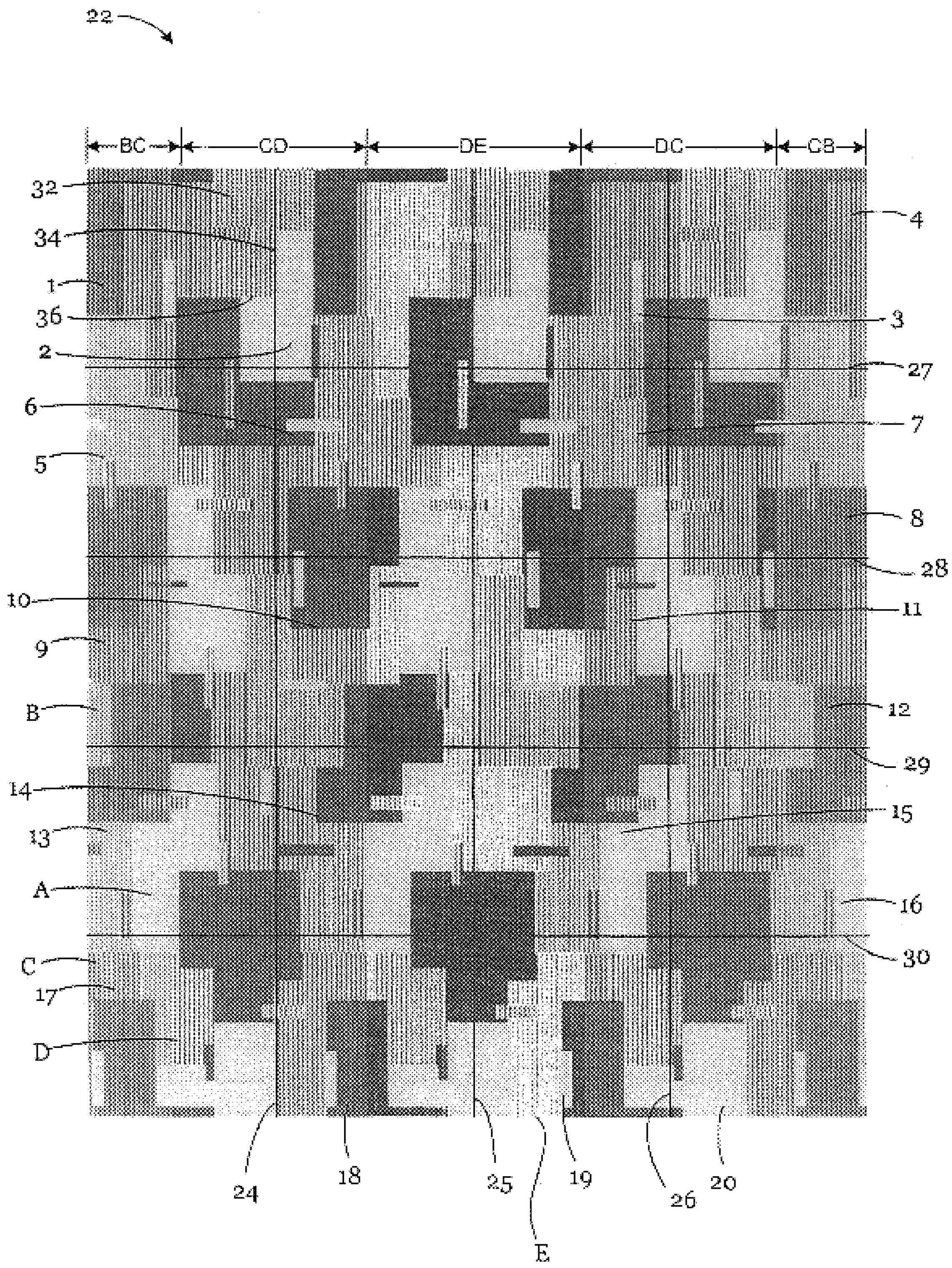
FIG. 1 is a top plan view of a carpet tile web produced in accordance with one embodiment of this invention.
Figure 2:
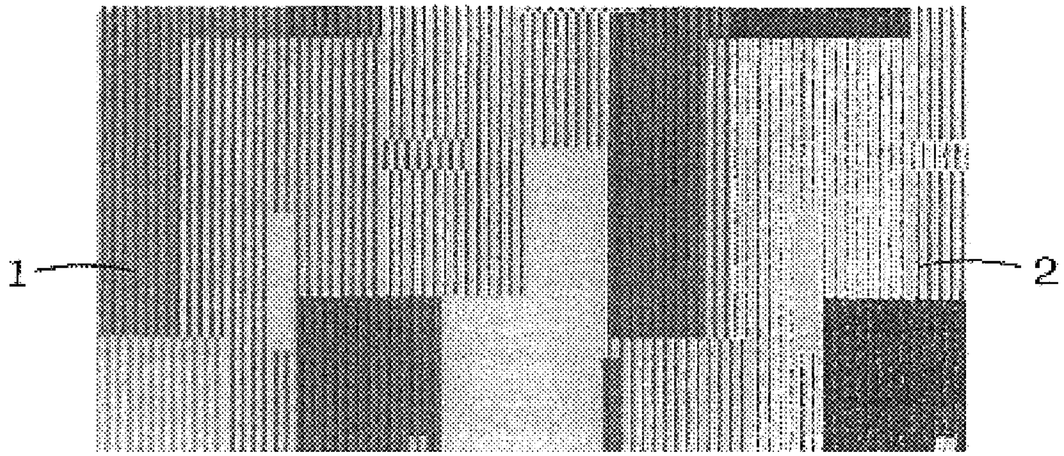
FIG. 2 is a top plan view of two carpet tiles produced in accordance with this invention positioned in a first orientation relative to each other.
Figure 3:
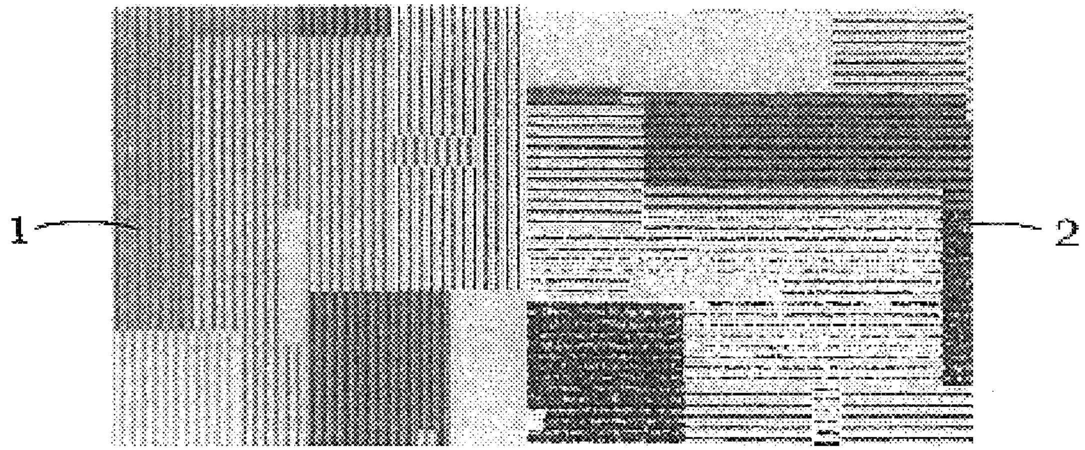
FIG. 3 is a top plan view of the two carpet tiles illustrated in FIG. 2 with one of the tiles rotated ninety degrees from the orientation illustrated in FIG. 2.
Figure 4:
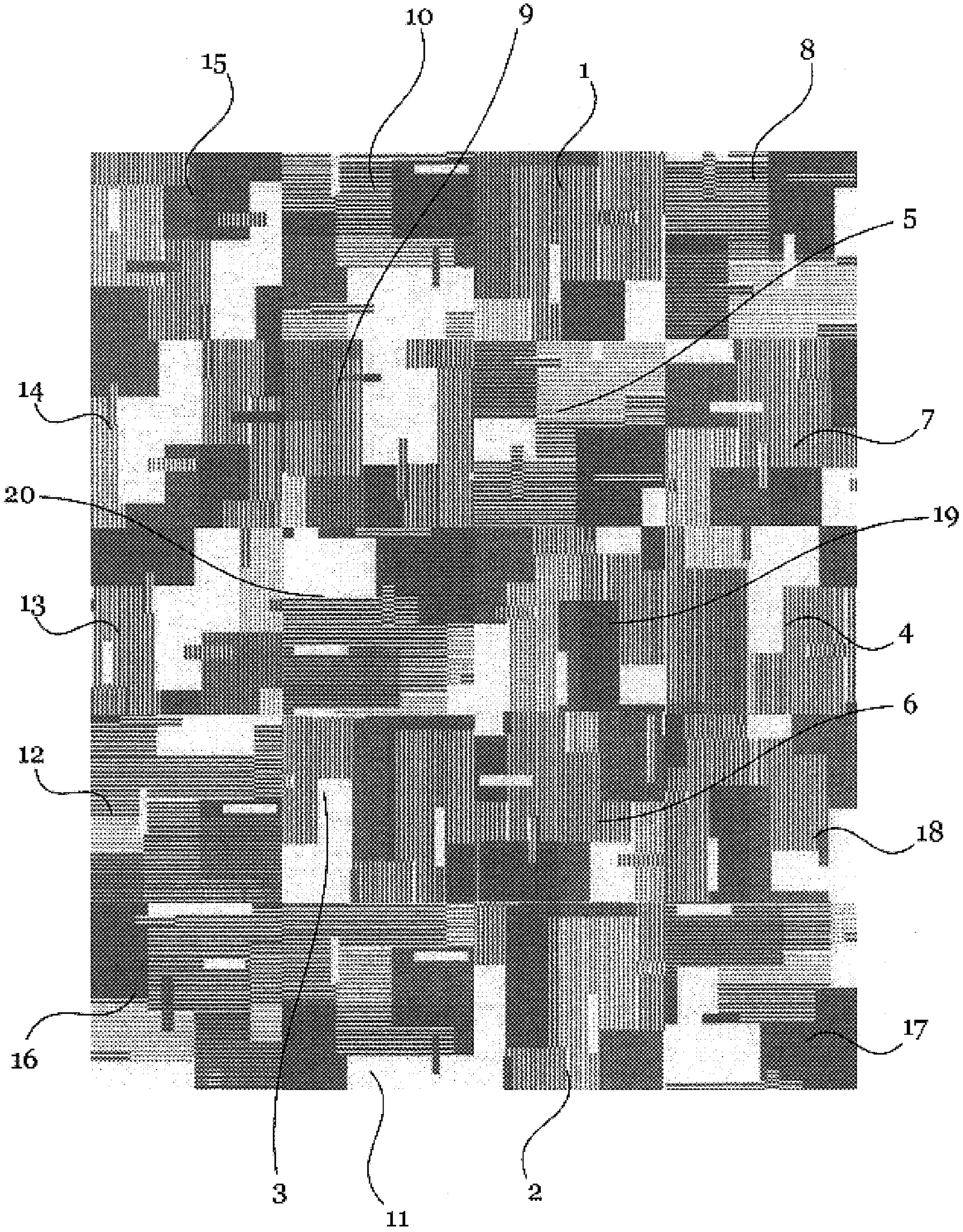
FIG. 4 is a top plan view of an assembly of carpet tiles cut from the web of FIG. 1.
Figure 5:
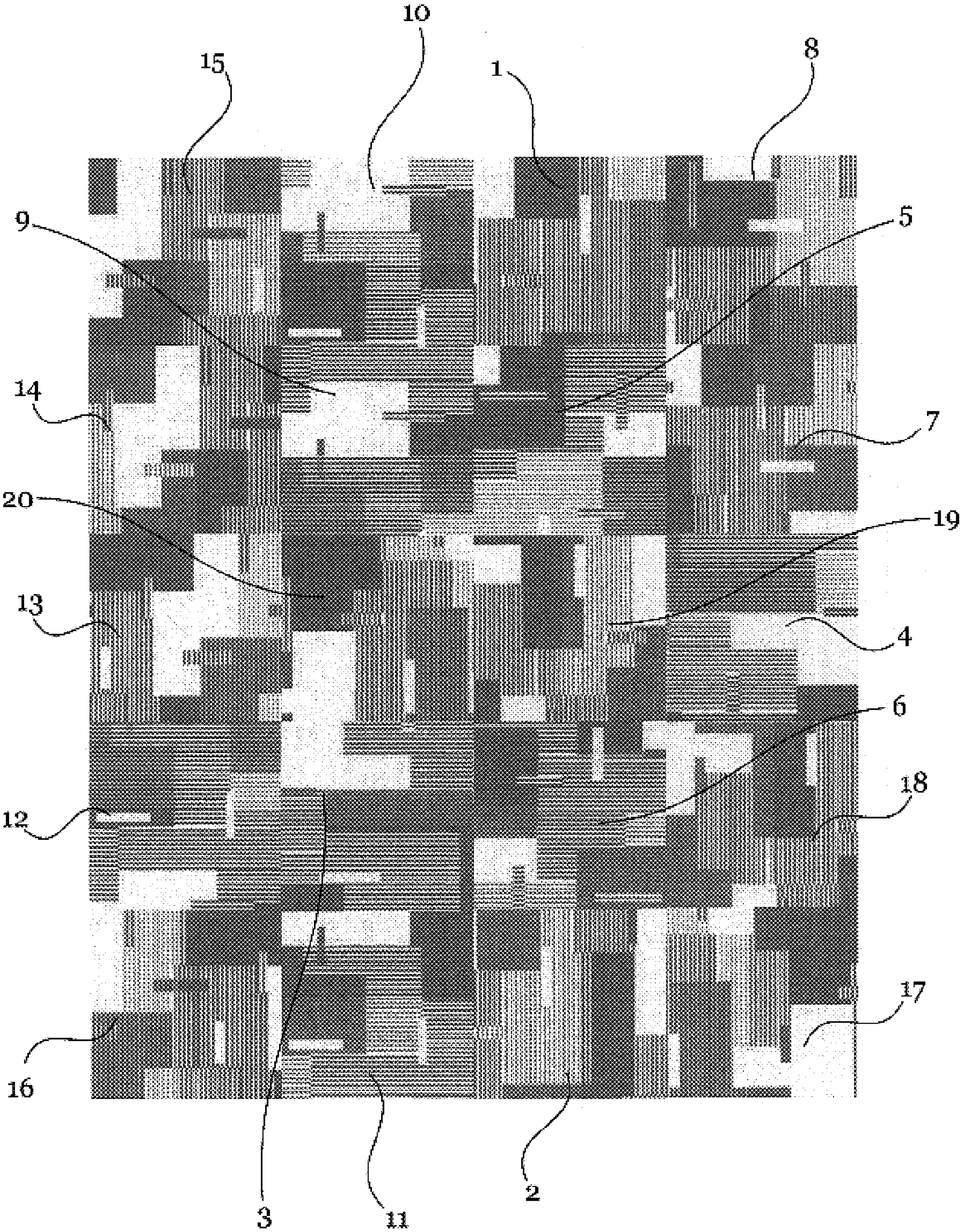
FIG. 5 is a top plan view of an assembly of carpet tiles cut from the web of FIG. 1.
Figure 6:
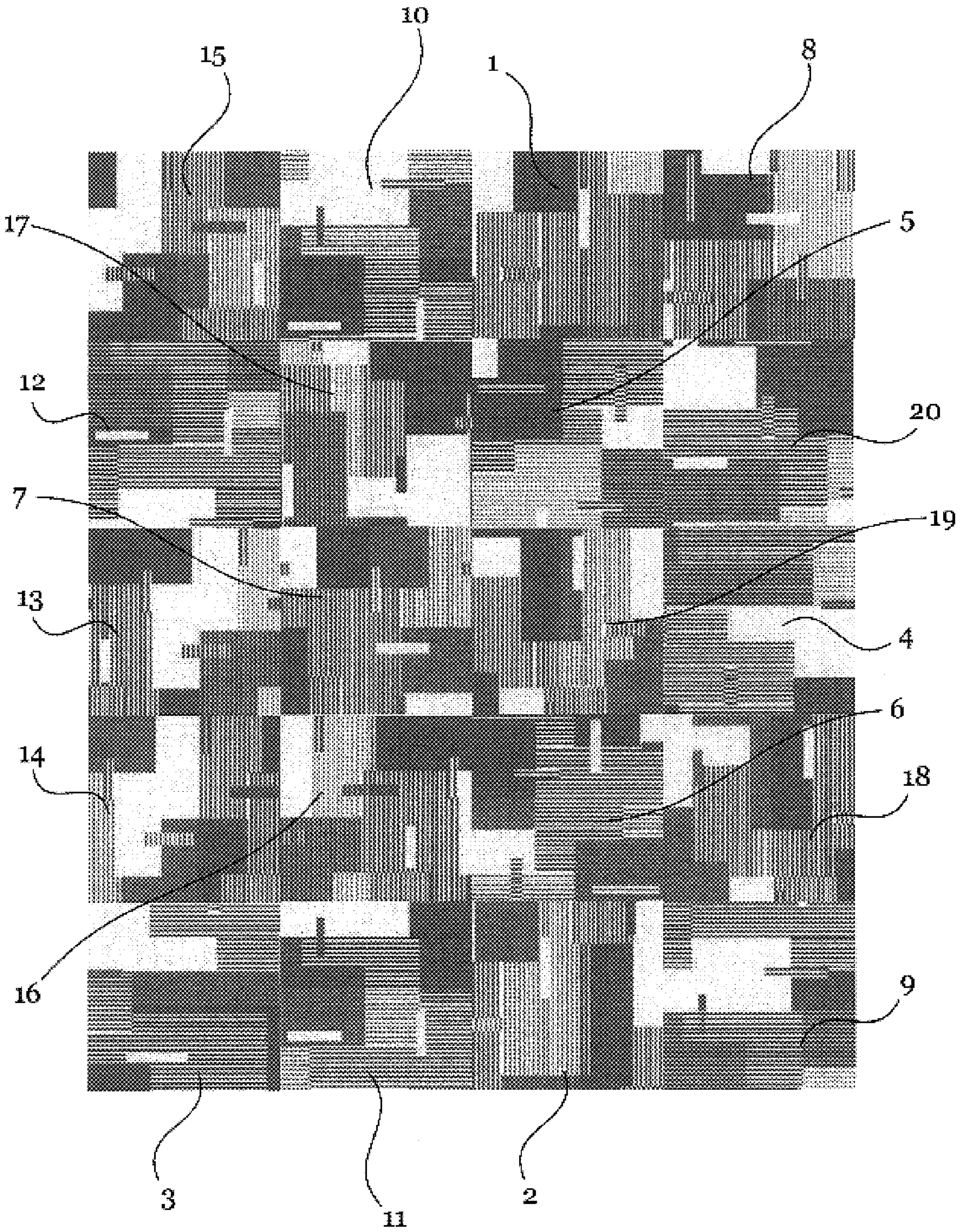
FIG. 6 is a top plan view of an assembly of carpet tiles cut from the web of FIG. 1.

FIG. 1 illustrates a carpet web 22 having a pattern consistent with this invention. Longitudinal partition lines 24-26 and horizontal partition lines 27-30 show how the web 22 may be partitioned into twenty individual carpet tiles 1-20. A number of factors contribute to the orthogonal ambiguity of each carpet tile, including pattern shapes and arrangement and shape colors.

The pattern produced on web 22 produces tiles with shapes that appear randomly positioned on the tile. Only shapes having certain characteristics are usable. First, at least some of the shapes must have straight sides parallel to the "machine" and "cross-machine" direction of the web 22, and therefore parallel to the tile edges. For instance, shape 32 in FIG. 1 has a straight side 34 parallel to longitudinal partition line 24 and therefore parallel to the edge of tile 1 that will be defined by longitudinal partition line 24. Similarly, shape 32 has a straight side 36 parallel to horizontal partition line 27, and it, too, will parallel the edge of tile 1 that will be defined by horizontal partition line 27. Partition line 24 will pass through and partition shape 32, thereby resulting in a portion of shape 32 ending up on each of tile 1 and 2. The straight edge of shape 32 that will appear on each of tile 1 and 2 will not appear to be out of place.

Size of the shapes within the pattern is also important, as is lateral position of the shapes within the web. The shapes must generally be small enough so that several shapes will end up positioned within each tile. Otherwise, the fraction or fractions of larger shapes falling on a particular carpet tile would potentially look odd. Shapes should be positioned laterally within the web so that longitudinal partition lines 24, 25, and 26 do not partition a shape so that an oddly narrow portion falls on one of the tiles.

Each tile preferably has the same background color. At least one color, different from the background color, is used to form the shapes on the tile. Regardless of how many colors are used, all of the colors should have similar intensities so that no one color significantly stands out from the other colors. Note that multiple shapes may be, and preferably should be, formed on each tile. It is important, however, that each shape have at least one color in common with adjacent shapes on the tile. Use of multiple shapes and colors contributes to the apparent random quality of the pattern, thereby making an installation of such tiles appear to be continuous without regard to the orthogonal orientation of the tiles within the installation.

While the adjacent shapes of each tile have at least one color in common, additionally, each tile preferably has at least one color in common (in addition to the background color) with every other tile, so that when the tiles are laid, the colors on adjacent tiles will coordinate.

Because the pattern on each tile appears random, placement of the tiles on the floor in any orientation simply creates a larger, apparently random pattern, rendering it impossible for any tile to look out of place. Such apparent randomness obviates the need to align the nap or "direction" of adjacent tiles, as misaligned naps further enhance the random appearance of the carpeting. Such randomness also masks color variation resulting from dye lot differences.

In summary, the "rules" for creating a pattern in accordance with this invention are:

1. Utilization of a background color for the entire web from which tiles will be cut.
2. Utilization of a pattern of shapes on the web formed by colors of approximately the same intensity as the background color and each other.
3. Utilization of shapes small enough for several to appear on each tile.
4. Utilization of shapes having straight edges parallel to the tile edges.
5. Utilization of a pattern causing each tile cut from the web to have at least 1 color in common with each other tile.

The carpet web 22 shown in FIG. 1 practices these rules and may be formed by a conventional carpet tufting machine. For example, a tufting machine having two rows of needles may be used. One row of needles may be threaded up with a single background color that is present across the entire carpet web 22. The second row of needles may be threaded with yarns of other colors as described below. The pattern of shapes is created on the carpet web by controlling the height of the yarn. The farther the yarn is pushed through the primary backing, the greater its height in the finished carpet tile and the more predominant the color of the yarn is to the ordinary observer. In the pattern shown in FIG. 1, the background yarn A tufts have a uniform height across their entire pattern, so that at least some background yarn A is visible in all areas of the pattern, and some areas show only background yarn A.

For ease of manufacture, in the embodiment shown in FIG. 1 the color scheme of the carpet web 22 is symmetrical about the longitudinal partition line (and also longitudinal axis) 25 of the carpet web 22. This means that the two side-by-side tiles 1 and 2 on one side of a production line can be boxed together, while the two side-by-side tiles 3 and 4 on the other side of the production line can be boxed together, and all boxes will have the same proportions of tiles having a particular color combination. This symmetry would not be necessary if tiles from the entire line were used to fill all of the boxes or other packages of tiles produced together.

The background color A (in this instance, yellow) is tufted over the entirety of the carpet web 22. The patterns of the outer portions BC of the web 22 are further formed from alternating colors B and C (light green and dark green, respectively, in this embodiment). Directly adjacent the outer portions BC, the patterns of middle portions CD are further formed from alternating colors C and D (dark green and blue, respectively, in this embodiment). Finally, the patterns of center portion DE are further formed from alternating colors D and E (blue and purple, respectively, in this embodiment).

While the carpet web 22 may be divided into any number of tiles, the carpet web 22 of FIG. 1 is divided into tiles 1-20 so that at least part of each tile has the color schemes of at least two of the portions—BC, CD, and DE. For example, outer portion BC and middle portion CD make up tile 1. In this embodiment, the shapes of tile 1 are made from: (1) the background color A only; (2) the background color A and color B only; (3) the background color A and color C only; (4)

the background color A, color B, and color C; (5) the background color A and color D only; and (6) the background color A, color C, and color D. In this way, adjacent shapes of each tile have at least one common color.

Moreover, adjacent tiles have at least one color in common (in addition to the background color). For example, tile 1 and tile 2 have both color C and color D in common. When the tiles are placed on the floor, therefore, the colors on these adjacent tiles blend to facilitate the appearance of continuity.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims. For instance, different shapes and sizes of shapes than those illustrated can be used. Similarly, a wide variety of color combinations are possible. Furthermore, while the embodiment described above is tufted, the face fabric could also be woven on a conventional or computer controlled Jacquard or other loom, and the face fabric could be fusion bonded or formed in other manners. This invention could also be used for modular flooring or surface covering materials other than carpet tile, such as vinyl tile.

What is claimed is:

1. Carpet tiles comprising tile edges and textile faces, each face having a pattern comprising a plurality of shapes having shape edges, wherein the pattern on each tile face comprises:

a. a plurality of shapes, at least two of which are adjacent to each other and comprise at least one common color;

b. a first yarn having at least one color and a second yarn having at least one color different from the at least one color of the first yarn;

c. a shape comprising at least one shape edge parallel to a first pair of opposed edges of the tile on which the shape appears and at least one shape edge parallel to a second pair of opposed edges of the tile on which the shape appears;

wherein:

d. the tiles all comprise the at least one color of the first yarn;

e. at least some of the tiles comprise at least one color in common in addition to the at least one color of the first yarn;

f. each tile comprises a color of intensity similar to the intensity of a color on another tile; and g. when the tiles are assembled on a flooring surface so that each tile is adjacent to and abuts at least one other tile, the tiles exhibit orthogonal ambiguity without pattern alignment between adjacent tiles.

2. The carpet tiles of claim 1, wherein the tiles have tufted faces.

3. The carpet tiles of claim 1, wherein at least one shape of each pattern comprises only the first yarn.

4. The carpet tiles of claim 1, wherein at least one shape of each pattern comprises the first yarn and the second yarn.

5. The carpet tiles of claim 1, wherein each pattern further comprises a third yarn having at least one color different from the at least one color of the first yarn and the at least one color of the second yarn.

6. The carpet tiles of claim 5, wherein at least one shape of each pattern comprises only the first yarn and the third yarn.

7. The carpet tiles of claim 5, wherein each pattern further comprises a fourth yarn having at least one color different from the at least one color of the first yarn, the at least one color of the second yarn, and the at least one color of the third yarn.

8. The carpet tiles of claim 7, wherein at least one shape of each pattern comprises only the first yarn and the fourth yarn.

9. The carpet tiles of claim 1, wherein each shape comprising at least one shape edge parallel to a first pair of opposed edges of the tile on which the shape appears and at least one shape edge parallel to a second pair of opposed edges of the tile on which the shape appears comprises at least two shape edges parallel to the first pair of opposed edges of the tile on which the shape appears and at least two shape edges parallel to the second pair of opposed edges of the tile on which the shape appears.

10. The carpet tiles of claim 1, wherein at least some of the shapes of the pattern on each tile are formed from at least one of a plurality of yarns comprising at least the first yarn, the second yarn, and a third yarn, wherein at least one of the shapes on each tile is formed from the first yarn only, at least one of the shapes on each tile is formed from the first yarn and the second yarn only, at least one of the shapes on each tile is formed from the first yarn and the third yarn only, and at least one of the shapes on each tile is formed from the first yarn, the second yarn, and the third yarn, wherein the first yarn, the second yarn, and the third yarn each comprises at least one color of intensity similar to the intensities of at least one color on the other two yarns.

11. The carpet tiles of claim 1, wherein at least some of the shapes on each tile face comprise shape edges that do not intersect a tile edge.

12. The carpet tiles of claim 1, wherein at least one of the carpet tiles comprises a color not present on at least another of the tiles.

13. Floorcovering comprising at least two carpet tiles of claim 1 positioned adjacent to each other and in abutment on a flooring surface.

14. The floorcovering of claim 13, wherein the at least two carpet tiles comprises yarn dyed in a different dye lot than yarn of the other of the at least two carpet tiles.

15. The floorcovering of claim 13, wherein at least one of the carpet tiles comprises a color not present on at least another of the tiles in the floorcovering.

* * * * *